US009969401B2

(12) United States Patent
Birkelund

(10) Patent No.: US 9,969,401 B2
(45) Date of Patent: May 15, 2018

(54) CLICKABLE HAND CONTROL DEVICE IN A VEHICLE

(71) Applicant: AUTOMAX APS, Vorbasse (DK)

(72) Inventor: Max Birkelund, Vorbasse (DK)

(73) Assignee: AUTOMAX APS, Vorbasse (DK)

( * ) Notice: Subject to any disclaimer, the term of this patent is extended or adjusted under 35 U.S.C. 154(b) by 0 days. days.

(21) Appl. No.: 14/912,687

(22) PCT Filed: Aug. 15, 2014

(86) PCT No.: PCT/DK2014/050244
§ 371 (c)(1),
(2) Date: Feb. 18, 2016

(87) PCT Pub. No.: WO2015/024570
PCT Pub. Date: Feb. 26, 2015

(65) Prior Publication Data
US 2016/0200325 A1 Jul. 14, 2016

(30) Foreign Application Priority Data

Aug. 22, 2013 (DK) .................................. 2013 70459

(51) Int. Cl.
G05G 11/00 (2006.01)
B60W 30/18 (2012.01)
(Continued)

(52) U.S. Cl.
CPC ...... *B60W 30/18181* (2013.01); *B60W 10/04* (2013.01); *B60W 10/18* (2013.01);
(Continued)

(58) Field of Classification Search
CPC ........... B60W 30/18181; B60W 10/04; B60W 10/18; B60W 30/1819; B60W 2540/12; B60K 2026/028
See application file for complete search history.

(56) References Cited

U.S. PATENT DOCUMENTS 2,658,409 A * 11/1953 Hughes ................. B60W 30/18
74/481
2,949,044 A * 8/1960 Hughes ................. B60W 30/18
74/481
(Continued)

FOREIGN PATENT DOCUMENTS

AU 596911 B2 2/1989
GB 2281955 A 3/1995
(Continued)

OTHER PUBLICATIONS

International Search Report and Written Opinion from International Application No. PCT/DK2014/050244, dated Oct. 20, 2014.

*Primary Examiner* — Zakaria Elahmadi
(74) *Attorney, Agent, or Firm* — Merchant & Gould P.C.

(57) ABSTRACT

There is provided a hand operable device for handicapped persons driving a car. More particularly, there is provided a hand operated device for actuating vehicle acceleration and brake pedals. The device includes a brake bar having in a first end attaching means for attachment to a brake pedal of the vehicle, said brake bar having in a second end a joint to a handle bar for transversely supporting the brake bar. The handle bar is provided with means for electronically regulating the speed of the vehicle and attachment means for releasably attaching the handle bar via a mounting piece to (or near) the steering column without the use of tools.

2 Claims, 1 Drawing Sheet

(51) Int. Cl.
*B60W 10/04* (2006.01)
*B60W 10/18* (2012.01)
*B60K 26/02* (2006.01)

(52) U.S. Cl.
CPC ... *B60W 30/1819* (2013.01); *B60K 2026/028* (2013.01); *B60W 2540/12* (2013.01)

(56) References Cited

U.S. PATENT DOCUMENTS

| | | | | |
|---|---|---|---|---|
| 3,373,628 A | * | 3/1968 | Lake | B60W 30/18 74/484 R |
| 4,424,723 A | * | 1/1984 | Gockel | B60W 30/18 403/100 |
| 4,436,191 A | | 3/1984 | Perry | |
| 4,476,954 A | * | 10/1984 | Johnson | B60W 30/18 123/352 |
| 4,541,497 A | * | 9/1985 | Riediger | B62D 11/183 180/333 |
| 4,788,879 A | | 6/1988 | Ulrich | |
| 5,025,905 A | * | 6/1991 | Lenz | B60W 30/18 477/209 |
| 5,129,492 A | * | 7/1992 | Lenz | B60T 7/08 477/27 |
| 5,341,894 A | * | 8/1994 | Van Gorder, Jr. | B60K 28/10 180/271 |
| 5,709,131 A | * | 1/1998 | Gummery | B60W 30/18 477/209 |
| 5,913,945 A | * | 6/1999 | Froelich | G05G 1/46 254/DIG. 5 |
| 6,672,281 B1 | * | 1/2004 | Cinpinski | B60W 30/18 123/396 |
| 2005/0023068 A1 | * | 2/2005 | Ahnafield | B60W 30/18 180/315 |
| 2014/0298944 A1 | * | 10/2014 | Gibbs | B60T 7/06 74/481 |

FOREIGN PATENT DOCUMENTS

WO   WO 2006/051532 A2   5/2006
WO   WO 2006/108925 A1   10/2006

* cited by examiner

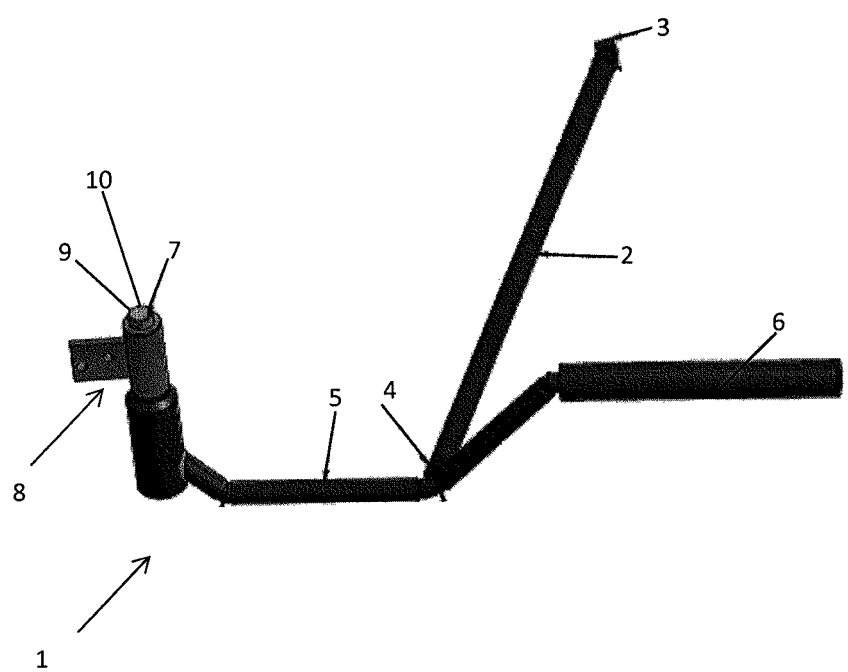

CLICKABLE HAND CONTROL DEVICE IN A VEHICLE

This application is a National Stage Application of International Application No. PCT/DK2014/050244, filed 15 Aug. 2014, which claims benefit of Serial No. PA 2013 70459, filed 22 Aug. 2013 in Denmark and which applications are incorporated herein by reference. To the extent appropriate, a claim of priority is made to each of the above disclosed applications.

FIELD OF THE INVENTION

The present invention relates to hand operable devices for handicapped drivers. More particularly, the present invention relates to a hand operated device for actuating vehicle acceleration and brake pedal.

BACKGROUND OF THE INVENTION

Handicapped people that are limited to use solely their upper body parts are limited to vehicles having hand operated actuating systems. Car conversion systems in which the accelerator and the brake pedals are hand-operated are known in the art. Mostly, add-on systems are provided with operating lever or levers that is engaged with both accelerating pedal and the brake pedal of the car wherein push and pull operations are operated by the hands of the driver. The challenge in engineering and designing such systems lie in the limited space beneath the steering wheel.

There is a long felt need to provide a driving accessory for the handicapped in which the acceleration and brake pedals are hand actuated that is easily operable by push-pull levers. Moreover, there is a need to provide a system that is provided within the space between the pedals and the hand area of the driver without limiting or restricting this space so as to allow a conveniently positioned system.

For disabled persons there have been developed various driving control systems by means of which it is possible to drive a vehicle using only the hands. The known solutions have a drawback that it is difficult and time-consuming to mount the driving control system to the vehicle. Moreover, it takes a skilled mechanic to mount the system and changes are often required in the cabin structures of the vehicle.

WO2006051532 discloses a hand-operated system for actuating acceleration and brake pedals in a vehicle. The system comprises a main body adapted to be fixedly attached to the vehicle in the vicinity of the driver's hands, a handle connected to the main body wherein the handle is adapted to be moved forwardly and backwardly in order to operate the vehicle; two levers pivotally connected to the main body wherein the levers are engaged with the acceleration and brake pedals through connecting rods; and a cable connecting the lever that actuate the acceleration pedal.

WO2006108925 discloses a driving control device, wherein the lower ends of the operating bars of the driving control device may be attached to the pedals of the vehicle, and the upper ends thereof may be supported in the transverse direction with a mounting piece. The mounting piece comprises a pliable attachment strap that may be tightened around the steering column with a mechanical tightening mechanism.

U.S. Pat. No. 6,672,281 B1 driving control device for a vehicle, the driving control device comprising: a brake bar having in a first end attaching means for attachment to a brake pedal of the vehicle, said brake bar having in a second end a joint to a handle bar; a handle bar for transversely supporting the brake bar at the joint of the brake bar, said handle bar provided with means for electronically regulating the speed of the vehicle, said handle bar provided with a handle in the first end, and attachment means in the second end of the handle bar; and where the attachment means includes a locking mechanism. Meanwhile, the locking mechanism requires that the device is fixedly attached somewhere in the vicinity of the steering column and is not easy to detach.

The devices described in the prior art suffers from several drawbacks, in particular the time consuming procedure for installing the devices in the car. This is a major problem for the rental car business that is legally obliged to offer cars for disabled persons. Hence, a quick and safe solution for installing such devices is needed. Moreover, there is a need for a device, which ensures that simultaneous braking and acceleration of the car cannot be performed by the driver.

SUMMARY OF THE INVENTION

The present invention overcomes the problems of the prior art by providing a driving control device (1) to a vehicle, the driving control device comprising a brake bar (2) having in a first end attaching means (3) for attachment to a brake pedal (not shown) of the vehicle, said brake bar (2) having in a second end a joint (4) to a handle bar (5), said handle bar (5) for transversely supporting the brake bar at the joint (4) of the brake bar (2), said handle bar (5) provided with means for electronically regulating the speed of the vehicle (not shown), said handle bar provided with a handle (6) in the first end, and attachment means (7) in the second end of the handle bar, wherein the attachment means includes a locking mechanism (9) for releasably attaching the handle bar via a mounting piece (8) to (or near) the steering column (not shown) without the use of tools, wherein the attachment means is based on one of the following two embodiments i) or ii):

i) the locking mechanism (9) includes a rod (10) extending perpendicularly from the second end of the handle bar (5) for releasably attaching the handle bar (5) in the mounting piece mounted on the steering column, said mounting piece provided with a hole perfectly fitting the form of the rod, said rod provided with releasable protrusions for holding the rod in place when attached to the mounting piece.

When referring to releasably attaching the handle bar via a mounting piece to or near the steering column it means that the mounting piece does not necessarily have to be attached to the steering column but could or be attached nearby, such as under the driver's seat or somewhere else in the vicinity of the driver.

ii) the rod and hole configuration is reversed so that the hole is provided in the second end of the handle bar and the mounting piece is provided with a rod perfectly fitting the form of the hole, said rod provided with releasable protrusions for holding the rod in place when placed in the hole.

Preferably the rod and hole are cylindrical. It is also preferred that the rod is provided with protrusions that are released when the rod is in place in the cylindrical hole of the mounting piece, whereby the protrusions protrude into a recess of the cylindrical hole or protrude over an end edge of the cylindrical hole.

The protusions may be manually locked in their protruded state thereby holding the rod in place. The protrusions may be small balls (preferably in metal) that are pushed out of the rod thereby engaging with the recess or edge of the hole.

The basic idea of the invention is that in connection with the rod and mounting piece there are quick-locking means, whereby the mounting piece can be attached to and detached from the vehicle quickly and easily without tools and anybody is able to carry out the mounting. In addition, the attachment bracket is mounted on the steering column.

The invention has an advantage that the driving control device can be attached to the vehicle quickly and even without any tools. In addition, the mounting piece can be attached to most vehicles without having to make any changes in the vehicle structures and without having to cause damage in any way to the cabin structures.

BRIEF DESCRIPTION OF THE DRAWING

One embodiment of the invention is described in greater detail in connection with the attached drawing, in which FIG. 1 is a perspective view of a driving control device according to the present invention.

DETAILED DESCRIPTION OF THE INVENTION

The driving control device (1) shown in FIG. 1 comprises a brake bar (2) having in one end attaching means (3) for attachment to a brake pedal (not shown) of the vehicle, which can be detachably mounted to a brake pedal.

Specifically and with reference to FIG. 1) there is shown a driving control device (1) to a vehicle, the driving control device comprising a brake bar (2) having in a first end attaching means (3) for attachment to a brake pedal (not shown) of the vehicle, said brake bar (2) having in a second end a joint (4) to a handle bar (5), said handle bar (5) for transversely supporting the brake bar at the joint (4) of the brake bar (2), said handle bar (5) provided with means for electronically regulating the speed of the vehicle (not shown), said handle bar provided with a handle (6) in the first end, and attachment means (7) in the second end of the handle bar, wherein the attachment means (7) includes a locking mechanism (9) for releasably attaching the handle bar via a mounting piece (8) to (or near) the steering column (not shown) without the use of tools.

One can brake the vehicle by pressing the handle bar downwardly with the hand, and correspondingly, one can accelerate the vehicle by turning the speed handle or other regulator electronically connected to the acceleration means of the vehicle. The handle bar may be designed such that it allows a firm hold for transmitting a sufficient force to the brake pedal.

The attachment means may comprise attachment plates, between which a pedal may be pressed with a screw, an eccentric clamp or a similar tightening means. Naturally, the attachment means may also apply other kinds of fasteners and components required in attachment. At the junction of the attaching means and the bar there may be a link, such as a ball joint, which enables the bar being set in a desired position in the vehicle and, and, the mutual movement of the bar and the pedal when the pedal is pressed down.

The bar may be a solid bar or tube made of metal, such as steel, or some other suitable material. It is essential that the bar is able to transmit longitudinal forces reliably for the operation of the pedal. The length of the bar may be adjustable. Thus, the bar may consist of two or more partly interfitting bar portions. By mutually adjusting the bar portions it is possible to set a desired bar length and thereafter the bar portions may be locked with a locking means.

The driving control device also comprises a mounting piece, by means of which the handle bar may be supported to the steering column of the vehicle such that the bar is well within the driver's reach. The mounting piece may comprise a pliable attachment bracket or other means that can be arranged around the steering column.

The mounting piece of FIG. 1 can be turned and attached in a desired position in relation to the central axis of the steering column. Further, distance of the attachment point may be set suitable in the longitudinal direction of the steering column.

After tightening the attachment means on the handle bar the device is locked such that it will not be able to slide back. The locking of the device may be based on a clasp, a quick-locking means provided with suitable shape-locking means or a clamp.

The invention claimed is:

1. A driving control device for a vehicle, the driving control device comprising:
   (a) a brake bar having in a first end attaching means for attachment to a brake pedal of the vehicle, said brake bar having in a second end a joint;
   (b) a handle bar for transversely supporting the brake bar at the joint of the brake bar, said handle bar extending from the joint in the second end of the brake bar, and including means for electronically regulating the speed of the vehicle, said handle bar provided with a handle in a first end of the handle bar, and an attachment means in a second end of the handle bar;
   (c) the attachment means includes a locking mechanism for releasably attaching the handle bar via a mounting piece without the use of tools; and
   (d) the locking mechanism includes a rod extending perpendicularly from the second end of the handle bar for releasably attaching the handle bar in the mounting piece mounted on or proximate a steering column, said mounting piece provided with a hole perfectly fitting the form of the rod, said rod provided with releasable protrusions for holding the rod in place when attached to the mounting piece, wherein the rod and the hole are cylindrical, and wherein the rod is provided with protrusions that are released when the rod is in place in the cylindrical hole of the mounting piece, whereby the protrusions protrude into a recess of the cylindrical hole or protrude over an end edge of the cylindrical hole.

2. The driving control device according to claim 1, wherein the protrusions are constructed to be manually locked in their protruded state thereby holding the rod in place.

* * * * *